(12) United States Patent
Taskett et al.

(10) Patent No.: US 6,345,766 B1
(45) Date of Patent: Feb. 12, 2002

(54) METHODS AND APPARATUS FOR PROVIDING A PREPAID, REMOTE MEMORY CUSTOMER ACCOUNT FOR THE VISUALLY IMPAIRED

(75) Inventors: John M. Taskett, Salt Lake; Barbara Piernot, Sandy, both of UT (US)

(73) Assignee: American Express Travel Related Services, New York, NY (US)

(*) Notice: Subject to any disclaimer, the term of this patent is extended or adjusted under 35 U.S.C. 154(b) by 992 days.

(21) Appl. No.: 08/510,590

(22) Filed: Aug. 2, 1995

(51) Int. Cl.[7] ............................................. G06K 19/06
(52) U.S. Cl. ..................... 235/493; 235/384; 235/379; 235/380
(58) Field of Search ................ 235/493, 384, 235/379, 380; 434/112, 113

(56) References Cited

U.S. PATENT DOCUMENTS

| | | | | |
|---|---|---|---|---|
| 4,404,764 A | * | 9/1983 | Wills et al. | 434/113 |
| 4,644,339 A | * | 2/1987 | Ruder | 340/731 |
| 4,761,542 A | * | 8/1988 | Kubo et al. | 235/379 |
| 4,815,125 A | * | 3/1989 | Al-Rawi | 235/489 |
| 5,033,964 A | * | 7/1991 | Phelps | 434/113 |
| 5,412,189 A | * | 5/1995 | Cragun | 235/379 |
| 5,498,860 A | * | 3/1996 | Ohno et al. | 235/384 |
| 5,511,114 A | * | 4/1996 | Stinson et al. | 235/380 |

FOREIGN PATENT DOCUMENTS

| | | | | |
|---|---|---|---|---|
| GB | 2226984 | * | 7/1990 | 434/113 |
| GB | 2263269 | * | 7/1993 | 434/113 |

* cited by examiner

Primary Examiner—Karl D. Frech
Assistant Examiner—Uyen-Chau N. Le
(74) Attorney, Agent, or Firm—Snell & Wilmer L.L.P.

(57) ABSTRACT

The present invention includes a prepaid telephone calling card for use by the visually impaired. A braille printer is configured to print a wallet-sized, plastic prepaid telephone calling card having one or more information fields printed in braille. A first information field printed in braille corresponds to an access number through which an individual can access a host computer for completing prepaid telephone calls. A second field printed in braille corresponds to a unique account code associated with the prepaid card. Various other information fields may also be printed in braille on the card, as desired. The information fields may also be printed in very large type face to facilitate reading by individuals who are not blind, yet substantially visually impaired.

3 Claims, 2 Drawing Sheets

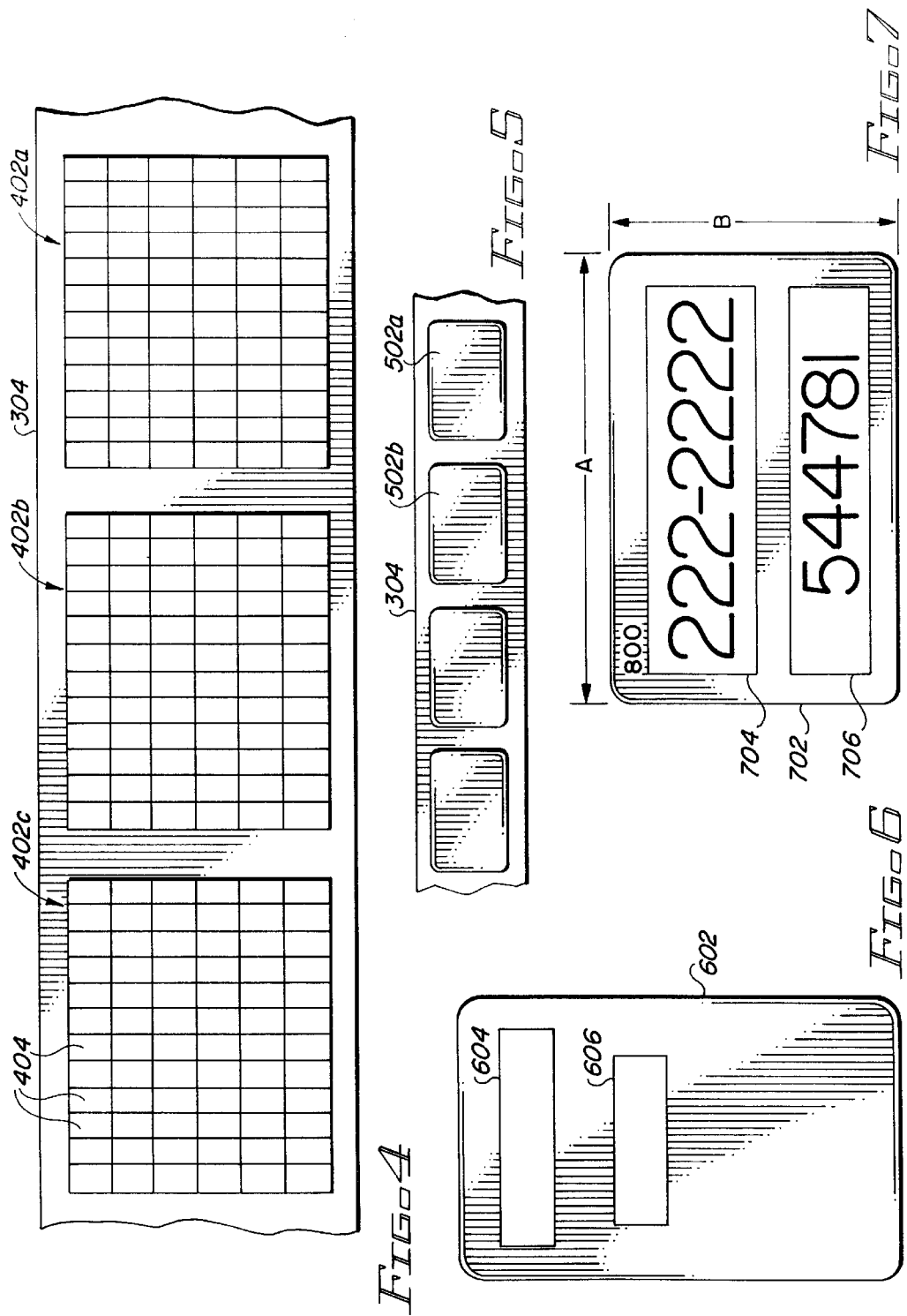

METHODS AND APPARATUS FOR PROVIDING A PREPAID, REMOTE MEMORY CUSTOMER ACCOUNT FOR THE VISUALLY IMPAIRED

TECHNICAL FIELD

The present invention relates, generally, to prepaid, remote memory accounts for use by visually impaired individuals to access goods and services, and, more particularly, to a system and method for configuring a braille printer to print prepaid telephone cards in a manner which facilitates their convenient use by visually impaired individuals.

BACKGROUND ART AND TECHNICAL PROBLEMS

Remote memory, prepaid accounts for use in purchasing goods and services such as long distance telephone calls are generally well known. Presently known schemes typically involve a printed document, for example a wallet-sized plastic or cardboard card which includes a unique account code and instructions for accessing a host computer to thereby place long distance telephone calls. To utilize the prepaid phone card the caller dials a special telephone number typically printed on the card, usually a toll free 1-800 number, whereupon a pre-recorded voice message prompts the caller to enter the access code (or account code) printed on the card. Upon entering the account number, for example by using the telephone key pad to generate dual-tone multi-frequency (DTMF) tones representative of the account code, the host computer determines the amount of funds available (if any) in an account maintained by the host and associated with the particular account code entered by the caller.

If sufficient funds are available in the account, the host computer issues a voice prompt to the caller indicating the number of minutes of telephone service available in the account, the amount of money left in the account, or any other suitable parameter. The host then prompts the caller to enter a destination telephone number. Once the destination number is entered, the host connects the caller with the desired destination, and monitors the duration of the call; when the account is nearly withdrawn or fully withdrawn, the host may either terminate the call or permit the caller to pay for the remainder of the call through any suitable mechanism, for example by replenishing the account, inserting coins into a pay phone, or charging the call to a credit card, debt card, or the like.

Prepaid telephone calling cards are typically printed in batches and shipped to retail outlets for sale to consumers; alternatively, batches of cards may be sent to employers for distribution to employees, for example as part an incentive program. In order to reduce fraud, security measures are often taken during manufacture and shipping to prevent unauthorized access to the account numbers printed on the cards. In this regard, the authorization codes (account numbers) or other relevant information may be obscured or otherwise covered by packaging techniques, scratch off surfaces, and the like until the card is placed in the hands of the ultimate consumer. In this way, unauthorized access to the security codes may be reduced until the card is properly purchased or the account properly activated.

The use of prepaid, remote entry telephone cards is particularly prevalent in the United States. However, since the use of remote memory schemes typically involves reading preprinted instructions from the card, the use of such cards by visually impaired individuals can be inconvenient or even impossible, depending on the degree of visual impairment. In particular, a visually impaired individual cannot readily read the telephone number which must be typically dialed to access the host computer system, nor can the visually impaired individual conveniently read the account code, serial number, or the like identifying a particular prepaid account.

Presently known techniques for permitting visually impaired individuals to use public telephones typically involve the use of braille characters on the telephone key pad. In this way, the visually impaired individual may interpret the braille characters on the key pad to facilitate dialing. However, no analogous mechanism is known for permitting visually impaired individuals to read dialing instructions, access codes, and the like from a conventional prepaid telephone calling card.

Braille printers and other devices for generating braille characters on printed documents are also generally well known. Indeed, the entire text of magazines, journals, and other information sources are widely available in braille form for many publications. However, neither prior art prepaid telephone cards nor prior art braille publications have proposed a scheme for permitting visually impaired individuals to utilize prepaid long distance telephone cards in a convenient manner.

A system and method are thus needed which will overcome the shortcomings of the prior art.

SUMMARY OF THE INVENTION

The present invention provides methods and apparatus for overcoming many of the shortcomings associated with the prior art. In accordance with a preferred embodiment of the present invention, a braille printer is configured to print a wallet-sized, plastic (or any other convenient material) prepaid telephone calling card having one or more information fields printed in braille. In accordance with a particularly preferred embodiment, a first information field printed in braille corresponds to an access number (e.g., an 800 telephone number) through which an individual can access a host computer for completing prepaid telephone calls; a second field printed in braille corresponds to a unique account code associated with the prepaid card. In addition, various other information fields may also be printed in braille on the card, as desired.

In accordance with an alternate embodiment of the present invention, a wallet-sized phone card of standard dimensions includes at least one information field printed in very large typeface to facilitate reading by individuals who are not blind, yet substantially visually impaired. This large type face may be employed either in conjunction with or in lieu of the aforementioned braille printing.

In accordance with a further aspect of the present invention, a braille printer is configured to generate a batch of prepaid telephone calling cards, each comprising a first field corresponding to a common telephone number (access number), and a second field corresponding to an account code. In accordance with a further aspect of the invention, the respective account codes are not numerically sequential in an exemplary embodiment; rather, they are generated in accordance with a predetermined algorithm.

BRIEF DESCRIPTION OF THE DRAWING FIGURES

The present invention will hereinafter be described in conjunction with the appended drawing figures, wherein like numbers denote like elements, and:

FIG. 4 is a schematic top view of a first embodiment of the conveyor of FIG. 3;

FIG. 5 is a schematic top view of an alternate embodiment of the conveyor of FIG. 3;

FIG. 6 is an exemplary prepaid telephone card for the visually impaired showing a first braille zone and a second braille zone; and FIG. 7 is an alternate embodiment of a prepaid telephone card for the visually impaired showing a first enlarged zone and a second enlarged zone.

DETAILED DESCRIPTION OF PREFERRED EXEMPLARY EMBODIMENTS

Figure 1:
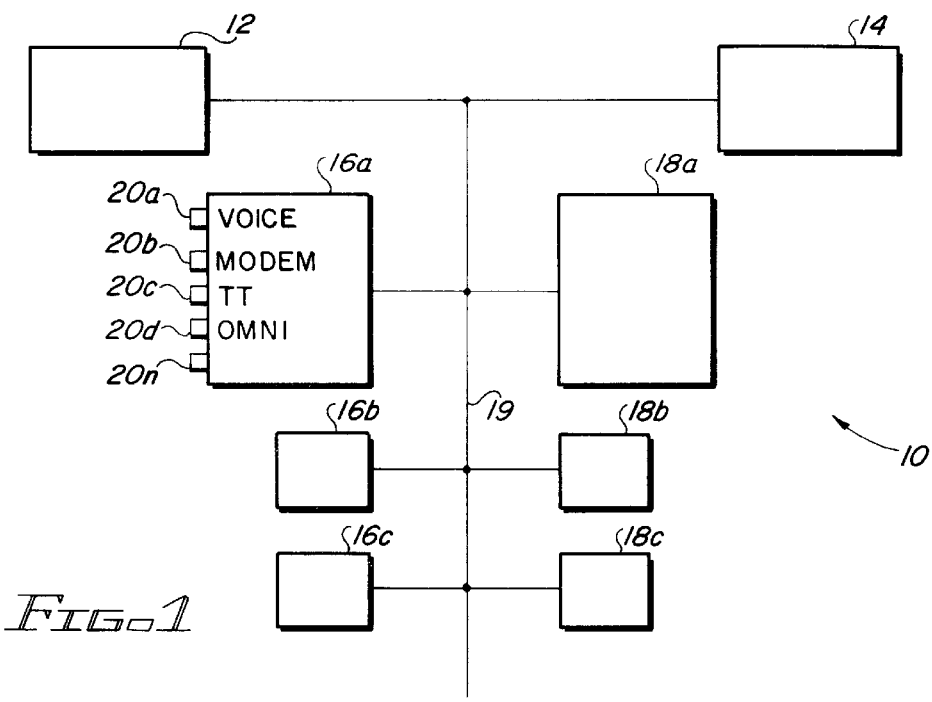
FIG. 1 is a schematic block diagram of a host computer system, including redundant file servers and respective incoming call trunks and outgoing call trunks.
Figure 2:
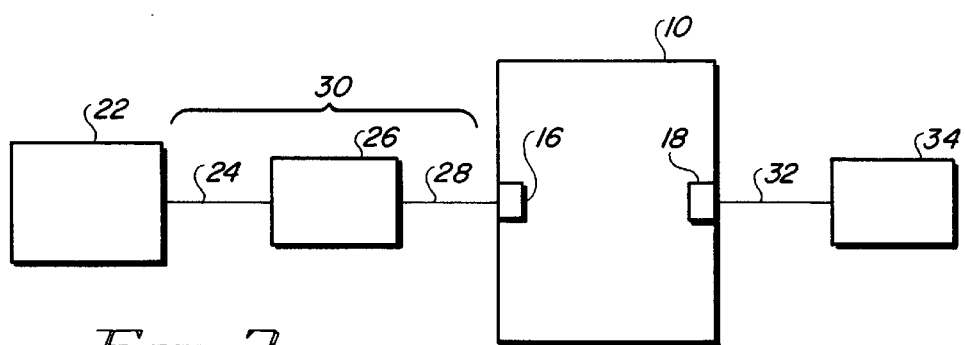
FIG. 2 is a schematic block diagram of a calling party, a switch, and a destination party.

Referring now to FIG. 1, a host system 10 suitably comprises a primary file server 12, a redundant file server 14, respective incoming call trunks 16a–16c, respective outgoing call trunks 18a–18c, and a communications bus 19. In accordance with a preferred embodiment of the present invention, file server 12 suitably coordinates the various functions performed by host 10, including call switching, call routing, call record creation, call processing, and management and control of the various accounts associated with the prepaid calling cards used by calling parties to access host 10. For a more complete discussion of prepaid calling card systems, see co-pending U.S. patent application Ser. No. 08/458,715 entitled Refundable Prepaid Telephone Card, and Ser. No. 08/456,525 entitled Methods and Apparatus for Providing a Prepaid, Remote Entry Customer Account, both filed Jun. 1, 1995 in the name of John Taskett, and the copending application Ser. No. 08/510,196, entitled Methods and Apparatus for Providing a Prepaid, Remote Entry Customer Account for the Hearing Impaired, also filed in the name of John Taskett concurrently herewith. The entire disclosures of these patent applications are incorporated herein by this reference.

With continued reference to FIG. 1, redundant file server 14 suitably functions as a backup server to permit sustained, uninterrupted long distance telephone service in the event file server 12 fails to perform satisfactorily.

Each of respective incoming call trunks 16 suitably have associated therewith a plurality of provider service telephone numbers. More particularly, an exemplary incoming trunk 16a suitably comprises a first telephone line 20a, a second telephone line 20b, and so on. In accordance with a preferred exemplary embodiment of the present invention, incoming line 20a suitably has a first telephone number (e.g., a toll-free"800" number) associated therewith configured to receive incoming voice calls. (Alternatively, line 20(a) may have a series of numbers associated therewith). Various other incoming lines 20(b)–20(d) suitably have associated therewith corresponding telephone numbers (or a series thereof), and are suitably configured to receive incoming calls from a plurality of incoming modalities, for example touch tone telephones, personal computers (PCs), modems, teletype machines for the hearing impaired (TTY), and the like.

File server 12 suitably houses and/or otherwise facilitates various appropriate operating instructions, software modules, prerecorded voice prompts, pre-configured data packets, and the like to facilitate the processing of calls received at the various incoming telephone lines associated with host system 10. In addition, file server 12 embodies software and operating instructions for controlling the out dialing of destination telephone numbers, and the various other switching and routing operations performed by switch 10.

When a calling party desires to make a prepaid long distance telephone card in accordance with the present invention, the calling party typically dials a predetermined telephone number (access number) associated with host 10, for example a toll-free 1-800 telephone number preprinted on a prepaid calling card in the possession of the calling party. With momentary reference to FIG. 6, an exemplary prepaid calling card 602 in accordance with the present invention suitably comprises various instructions, graphics, or the like (not shown) which may or may not be visible to an unimpaired observer. In addition, prepaid telephone card 602 further includes one or more information fields printed in braille, for example a first information field 604 and a second information field 606.

More particularly, when making a long distance telephone call in accordance with the present invention, the calling party suitably dials the predetermined access number, which may be conveniently printed in braille within field 604. Host 10 then prompts the caller, for example with a prerecorded voice prompt, to enter a personal identification number (PIN), account code, or other authorization code relating to the prepaid account to which the long distance telephone call will be charged. In accordance with a preferred embodiment of the present invention, the account number is suitably printed in braille on card 602 in field 606.

Upon entering the account number, for example by speaking the account number, generating DTMF (or other signals) on the telephone key pad, or the like, host computer 10 suitably accesses its internal database to determine whether sufficient funds exist in the account corresponding to the aforementioned account number to permit the calling party to place a long distance call. If desired, host 10 may inform the calling party of the amount of time and/or money remaining in the account, for example through prerecorded voice prompts. If sufficient funds exist, host 10 prompts the calling party to enter a desired destination telephone number, either through speaking the number into the telephone hand set, DTMF tones, or any other convenient modality.

Upon receiving the desired destination telephone number, host 10 connects the calling party with the destination, thereby completing the call. During the long distance telephone call, host 10 monitors the duration of the call and, when the available funds in the account are consumed, host 10 may be configured to take one of various steps, including: terminating the call; informing the calling party or the destination party that insufficient funds exist for further communication and inviting one of the parties to arrange for payment; assess additional charges to a prearranged credit card, debit card, charge card, bank or checking account, or the like.

In a typical prior art prepaid calling card (not shown), the foregoing dialing instructions, as well as the access telephone number, account code, and various other information are preprinted on a thin, planar, wallet-sized plastic telephone card which resembles a credit card. However, as discussed above, such preprinted information may not be readily observable by a visually impaired individual.

With continued reference to FIG. 6, by printing certain information on card 602 in braille, a visually impaired individual may utilize prepaid calling card 602 conveniently and efficiently. In this regard, virtually any combination of information may be printed in braille on card 602; in a preferred embodiment, only the minimum amount of information needed by the caller is printed in braille. Other information may of course be printed in braille, as desired, for example a separate customer service telephone number, the name of the card issuer or the long distance carrier, or virtually any other information which may be useful to the calling party.

Figure 3:
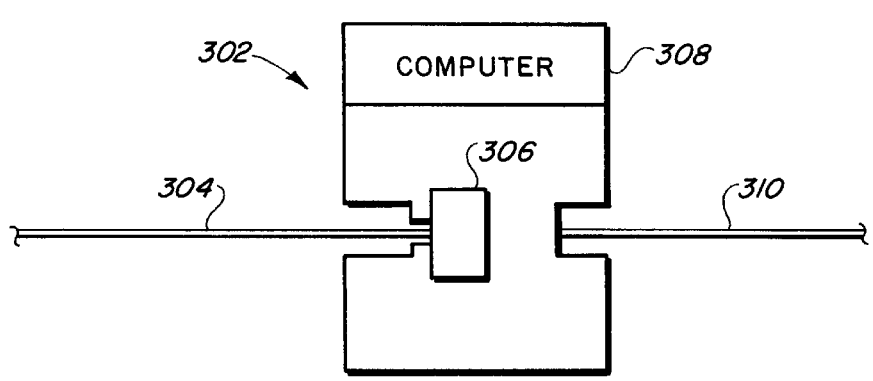
FIG. 3 is a schematic block diagram of a printer configured to print braille characters on blank prepaid telephone cards.

Referring now to FIG. 3, prepaid calling cards may be embossed with braille characters in any convenient manner. In accordance with a preferred exemplary embodiment, prepaid calling cards may be supplied to a printer 302, for example on a web or conveyor belt 304. Upon entering printer 302, the cards are embossed or otherwise imprinted with braille printing mechanism 306, and exit the printer via a discharge conveyor 310. A computer 308 associated with printer 302 suitably coordinates the braille printing, as discussed in greater detail below.

Referring now to FIGS. 4 and 5, printer 302 may be configured to receive cards in any convenient format. In particular, conveyor 304 may be configured to supply printer 302 with successive sheets 402a–402c of substrate. Each sheet 402 is suitably subdivided into a plurality of regions 404 (e.g., seventy-two regions), each corresponding to a unique prepaid telephone card. As each sheet 402 is engaged by printing mechanism 306, the printer head applies braille characters to each of respective cards 404, under the control of computer 308. In accordance with a preferred embodiment, each of respective cards 404 occupies a predetermined region on an X-Y coordinate system in the plane of sheet 402. Printing mechanism 306 suitably applies braille information to a first one of cards 404, whereupon the printer head is sequentially indexed to successive cards 404, until each card on sheet 402 is imprinted with the appropriate braille information. Moreover, if printing mechanism 306 is printing an information field onto each card which is the same for each card (e.g., the access number), the printing head may be configured to emboss each card without having to change the mechanical configuration of the printer. If, on the other hand, printing mechanism 306 is printing braille information which is different for each card, printing mechanism 306 may be conveniently configured to alter its mechanical configuration each time it is indexed to a successive card 404, for example to imprint respective unique account codes onto each of respective cards 404.

With continued reference to FIG. 4, after each sheet 402 is imprinted and exits printer 302, the sheet may be separated into columns whereupon each column is separated into individual cards.

Referring now to FIG. 5, an alternate embodiment of conveyor 304 involves respective cards 502a, 502b, and so on being sequentially fed into printer 302. In this regard, respective cards 502 may be physically separate from one another, or they may constitute a continuous web of card substrate which is subsequently cut into individual cards after being operated upon by printing mechanism 306.

Moreover, it may also be advantageous to employ a laminated substrate in the construction of prepaid telephone cards in accordance with the present invention. More particularly, typical embossed plastics are desirably substantially brittle to impede degradation (sometimes referred to as "flow") of the embossed characters. Inasmuch as brittle plastics may crack or break during extended use, a softer more pliable film layer is advantageously laminated onto one or both sides of the card. The aforementioned braille imprinting steps may be performed on the plastic substrate either before or after the aforementioned film layer is applied to one or both sides of the card, as desired.

In accordance with a preferred embodiment, polyvinyl acetate or any suitable material which accommodates embossing or braille printing may be used as the card substrate. Polyethylene or other suitable plastic films may be employed as the laminate, as desired.

Referring now to FIG. 7, an alternate embodiment of a prepaid telephone card for the visually impaired suitably comprises a card 702 including a first region 704 and a second region 706. More particularly, it is recognized that the term "visually impaired" contemplates a spectrum from blindness to slight visual impairment. Hence, for those individuals who are not blind but nonetheless have difficulty reading small print, it may be desirable to display certain key information on the card in a large type face to facilitate reading of key information by visually impaired (but not blind) individuals.

In accordance with a preferred embodiment, region 704 includes the telephone number for accessing the host computer, and region 706 includes the account code. In this way, a slightly visually impaired individual who may be familiar with the dialing instructions yet has difficulty reading prior art cards may conveniently use the prepaid card of the present invention, in part because the access number and account code appear in very large print.

With continued reference to FIG. 7, an exemplary telephone card in accordance with the present invention is suitably of approximately the same dimensions of a typical credit card, for example having a thickness in the range of 0.1 to 1.5 mm and preferably about 0.5 to 1.0 mm, and most preferably in the range of 0.7 to 0.8 mm, and having a dimension "A" in the range of 6 to 10 cm, and most preferably about 8.6 cm, and a dimension "B" in the range of 2 to 7 cm and most preferably about 5.4 cm. In the context of a particularly preferred embodiment, region 704 suitably exhibits a length (in "A" direction) on the order of 3 to 8.6 cm, and most preferably about 5 to 7 cm, and a height (in the "B" direction) on the order of 2 to 5 cm, and most preferably about 1.5 to 8.6 cm. Region 706 suitably exhibits a length (direction "A") on the order of 3 to 8.6 cm, and most preferably about 4 to 6 cm and a height ("B" direction) on the order of 2 to 5 cm, and most preferably about 1.5 to 2.5 cm.

Alternatively, it may be desirable to place region 704 on one side of the card and region 706 on the other side of the card, to permit both information fields to be printed as large as possible on a standard-sized card. In accordance with this alternate embodiment, respective regions 704 and 706 may suitably be on the order of 5 to 9 cm in length (and most preferably about 6 to 8 cm), and about 3 to 7 cm in height (and most preferably about 3 to 5 cm).

In accordance with yet a further embodiment of the present invention, the large visual fields associated with card 702 may be employed in conjunction with the braille fields associated with card 602 on the same prepaid telephone card; that is, a single card may exhibit both large lettering of key information (to assist the visually impaired who are not blind), while also exhibiting key information in braille to assist those who are either blind or otherwise have difficulty reading the large visual information fields, for example in poor lighting conditions.

In accordance with yet a further aspect of the present invention, one or both of the braille information fields and large type information fields may also be employed on a card which further exhibits a magnetic stripe, "smart card" contacts, embossed name or account information (whether in braille, English, or some other language), a hologram, a photograph of the card owner, or virtually any other feature which might be conveniently associated with a transaction card.

With continued reference to FIGS. 3–7, the subject prepaid telephone cards may be advantageously produced in batches, such that each card in a particular batch bears the same access telephone number, but a different (e.g., unique) account number. In this regard, the account code numbers are typically not numerically consecutive to reduce the incidence of fraud and mistake which might otherwise occur if one digit in the account code is deliberately (in inadvertently) changed. Rather, the various account codes associated with a particular batch of cards may advantageously be varied in accordance with a predetermined methodology. For example, one or more digits in the account numbers may be produced using a random number generator or pseudo-random number generator. Alteratively, one or more digits in the account codes may be generated in accordance with a predetermined algorithm. As yet a further alternative, one or more of the numbers of the digits comprising the account number may be generated from a set of reference account numbers through a cryptographic process. In this way, although the reference account numbers may be logically related or even numerically sequential, the actual account numbers appearing on the cards may be related to the reference numbers cryptographically, thus making it difficult to derive another account number based on the account number appearing on the card.

Although the invention has been described herein with reference to the appended drawing figures, it will be appreciated that the scope of the invention is not so limited. Various modifications in the sequence of steps and arrangement of components may be made without departing from the spirit and scope of the invention as set forth in the appended claims.

What is claimed is:

1. A prepaid long distance telephone card for use by the visually impaired, comprising a thin, planar, wallet-sized plastic card having a length on the order of 8.5 to 8.7 cm, and a height on the order of 5.3 to 5.5 cm, and a thickness on the order of 0.65 to 0.85 mm, the card exhibiting respective first and second opposing sides, comprising:

a first visual information field corresponding to an access telephone number, said first field having a length in the range of 5 to 8.5 cm and a height on the order of 2 to 5 cm; and a second visual information field corresponding to a prepaid, long distance telephone account code, said second field having a length on the order of 4.5 to 8 cm and a height on the order of 1.5 to 5 cm.

2. The card of claim 1, wherein said first and second visual fields appear on said first surface of said card, said first visual field having a length on the order of 5 to 6 cm and a height on the order of 2 to 3 cm, and further wherein said second visual field exhibits a length on the order of 5 to 5.5 cm and a height on the order of 1.5 to 2.5 cm.

3. The card of claim 1, further comprising a first braille word corresponding to one of said first and second visual fields.

\* \* \* \* \*